O. A. FRICK.
COMBINED BEARING AND LUBRICATING DEVICE FOR VEHICLE WHEELS.
APPLICATION FILED JAN. 11, 1915.
1,145,238.  Patented July 6, 1915.
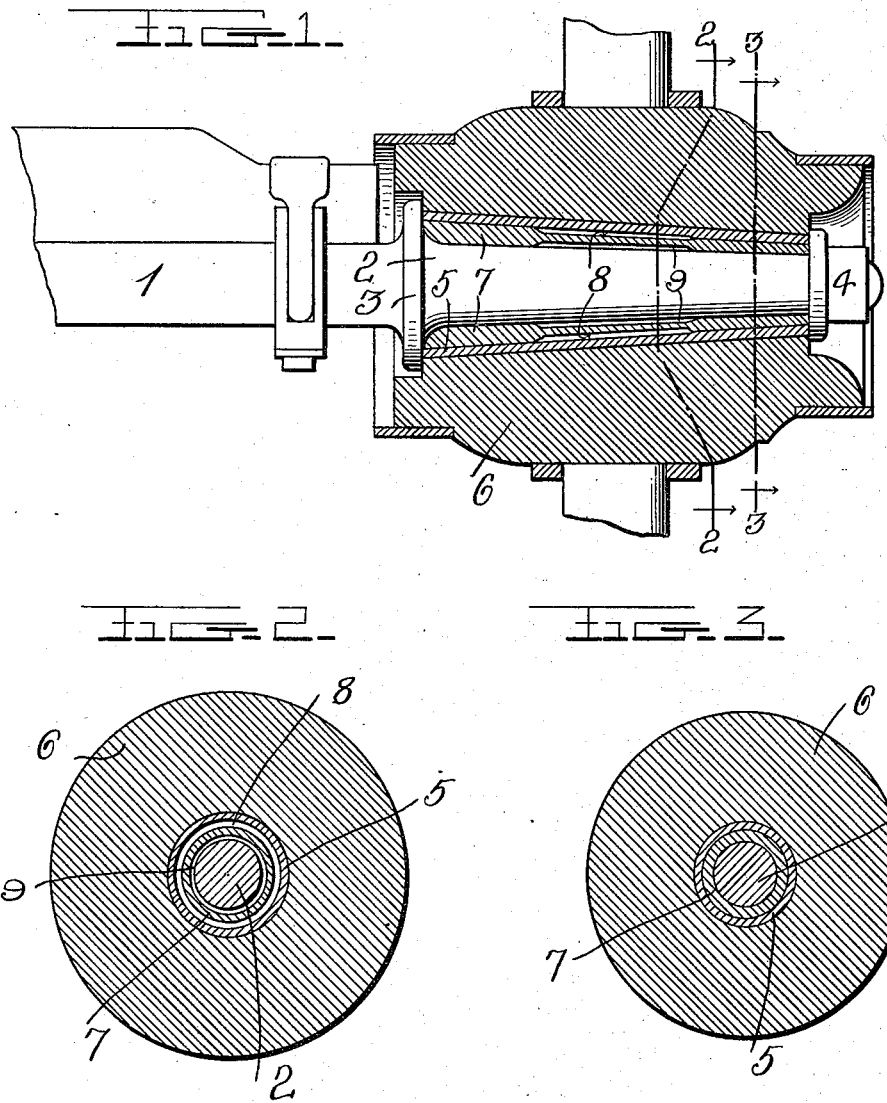

UNITED STATES PATENT OFFICE.

ORLANDO A. FRICK, OF DEFIANCE, OHIO.

COMBINED BEARING AND LUBRICATING DEVICE FOR VEHICLE-WHEELS.

1,145,238. Specification of Letters Patent. Patented July 6, 1915.

Application filed January 11, 1915. Serial No. 1,609.

*To all whom it may concern:*

Be it known that I, ORLANDO A. FRICK, a citizen of the United States, residing at Defiance, in the county of Defiance and State of Ohio, have invented certain new and useful Improvements in Combined Bearing and Lubricating Devices for Vehicle-Wheels; and I do declare the following to be a full, clear, and exact description of the invention, such as will enable others skilled in the art to which it appertains to make and use the same.

My invention relates broadly to improvements in bearings for revolubly mounting the wheels of vehicles, and more particularly to a specific form of such device designed to not only revolubly support the wheel, but to lubricate the same in such a manner as to allow a predetermined amount of grease to suffice for a period twice as long as such an amount would usually last.

The object of the invention is to accomplish the above result in the most simple and effective manner. In carrying out this object, I employ the specific details of construction hereinafter described and claimed and shown in the drawings wherein:

Figure 1 is a vertical longitudinal section through the hub of a wheel, the boxing thereof, and the sleeve to be described, this view showing a portion of an axle and its spindle in elevation, and Figs. 2 and 3 are vertical transverse sections as seen respectively on the lines 2—2 and 3—3 of Fig. 1.

In these drawings, a metal axle 1 is shown having a spindle 2 on its outer end, the inner end of said spindle being provided with a collar 3 integrally joined thereto and to the axle 1, while its outer end is provided with a nut 4 as is common with devices of this character. On opposite sides of the collar 3, comparatively large fillets are preferably employed, although this detail constitutes no part of the present invention.

Surrounding the spindle 2 and spaced therefrom, is a substantially cylindrical hub boxing 5 which is of common construction and is rotatably mounted in the hub 6, said boxing being of a length substantially equal to the distance between the collar 3 and the nut 4.

Surrounding the spindle and contacting therewith and with the inner side of the boxing 5, is a bearing sleeve 7 which is of a length substantially equal to the length of said boxing, the inner end of said sleeve being shaped to closely engage the adjacent fillet. As shown, this sleeve 7 is of greater thickness and diameter at its inner end than at its outer end, although this detail need not be followed too closely, the outer side of said sleeve is provided with a circumferential groove 8, and the inner side thereof is provided with a similar circumferential groove 9. Both of these grooves extend in width in opposite directions from the center of the sleeve, as most clearly seen in Fig. 1, and are both of the same or approximately the same width. By this simple expedient, both the inner and outer sides of the sleeve 7 will be lubricated to the same extent by filling both grooves with grease. This is very important, since as long as the contacting faces of the boxing 5 and sleeve 7 are lubricated to the same extent as the contacting faces of said sleeve and the spindle 2, and since the bearing area of said sleeve upon the boxing is greater than the bearing area of said sleeve upon the spindle, the sleeve will rotate with the wheel until practically all of the grease within the groove 9 has been exhausted. This amount of grease will lubricate the spindle a length of time equal to the usual lubricating means, but, when it no longer lubricates the contacting surfaces of the sleeve 7 and the spindle 2, said sleeve will tend to bind on or stick to the spindle 2, and the boxing 5 will rotate upon said sleeve, since the contacting surfaces of this sleeve and the boxing are lubricated by the grease of the outer groove 8 which has not been heretofore in use. This amount of grease will now serve to lubricate the device for a second period of time equal to the length of the period which the grease in the groove 9 has lasted. It will therefore be seen that by constructing and arranging the parts as above set forth, more efficiency is gained than can be gained from any of the patents above disclosed. It is therefore thought that although the improvements which I have made are only details of construction, that these details are sufficient to evidence the existence of invention.

I claim:

The combination with a cylindrical spindle having a stop collar on one end, a nut on its other end, and a cylindrical hub boxing surrounding said spindle and spaced therefrom, said boxing being of a length substantially equal to the distance between the collar and the nut, of a lubricating device comprising a single bearing sleeve within and contacting with the boxing, said sleeve surrounding and contacting with the spindle and being of a length equal to that of the boxing, the outer side of said sleeve having a circumferential grease receiving groove extending in width in opposite directions from its center, and the interior of said sleeve likewise having a circumferential grease receiving groove, the latter being of a width substantially equal to that of the other groove, whereby to lubricate the spindle and the boxing equally under normal conditions.

In testimony whereof I have hereunto set my hand in presence of two subscribing witnesses.

ORLANDO A. FRICK.

Witnesses:
JOHN W. WINN,
A. L. BAKER.

Copies of this patent may be obtained for five cents each, by addressing the "Commissioner of Patents, Washington, D. C."